United States Patent
Mohanan et al.

(10) Patent No.: US 11,861,147 B1
(45) Date of Patent: Jan. 2, 2024

(54) GRAPHICAL USER INTERFACE AND EXECUTION SERVICE FOR ENABLING LIMITED-PRIVILEGE USERS TO CONTROL WIRE-TRANSFER APPLICATION FUNCTIONS IN A SECURE COMPUTING ENVIRONMENT

(71) Applicant: Truist Bank, Charlotte, NC (US)

(72) Inventors: Murali Mohanan, Marietta, GA (US); Noel Ciminello, North Dartmouth, MA (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/129,356

(22) Filed: Mar. 31, 2023

(51) Int. Cl.
*G06F 3/0482* (2013.01)
*G06F 3/0484* (2022.01)
*G06Q 20/40* (2012.01)
*G06Q 20/10* (2012.01)

(52) U.S. Cl.
CPC .......... *G06F 3/0484* (2013.01); *G06F 3/0482* (2013.01); *G06Q 20/10* (2013.01); *G06Q 20/401* (2013.01)

(58) Field of Classification Search
CPC .................. G06F 3/048–05; G06Q 20/10
See application file for complete search history.

(56) References Cited

U.S. PATENT DOCUMENTS

| | | | |
|---|---|---|---|
| 2002/0029337 A1* | 3/2002 | Sudia | H04L 9/3268 380/282 |
| 2009/0171724 A1* | 7/2009 | Allin | G06Q 10/06 705/30 |
| 2015/0271162 A1* | 9/2015 | Dulkin | H04L 63/1408 726/7 |
| 2019/0272607 A1* | 9/2019 | Neuman | G06Q 50/167 |

* cited by examiner

*Primary Examiner* — Daniel Rodriguez
(74) *Attorney, Agent, or Firm* — KilpatrickTownsend & Stockton LLP; Michael A. Springs, Esq.

(57) ABSTRACT

Computing environments can enable user initiation of wire-transfer application functionalities according to some aspects described herein. For example, a selection by a user of an option in a graphical user interface can be detected. The option can be for initiating a selected functionality of a wire-transfer application in a computing environment, and the user may not be authorized in the computing environment to interact with the wire-transfer application outside of the graphical user interface. In response, a text file can be generated that includes data identifying the selected functionality. The text file can be stored in a predefined storage location that is monitored by the execution service. The execution service can automatically detect a presence of the text file in the predefined storage location. In response, the execution service can automatically issue a command to the wire-transfer application for causing the wire-transfer application to execute the selected functionality.

20 Claims, 3 Drawing Sheets

GRAPHICAL USER INTERFACE AND EXECUTION SERVICE FOR ENABLING LIMITED-PRIVILEGE USERS TO CONTROL WIRE-TRANSFER APPLICATION FUNCTIONS IN A SECURE COMPUTING ENVIRONMENT

TECHNICAL FIELD

The present disclosure relates generally to computer security and, more particularly (although not necessarily exclusively), to graphical user interface and a corresponding execution service through which users with limited privileges in a secure computing environment can initiate wire-transfer application functions.

BACKGROUND

Computer environments can perform interactions such as wire transfers between two or more computer systems. In the context of a wire transfer, the interaction between the computer systems may be facilitated by via a wire-transfer application. Some users may have limited access and control over the wire-transfer application. For example, because of how a computer system is configured, some users may be restricted from submitting commands to a wire-transfer application or may be limited in the commands that they can submit. Such users may be foreclosed from submitting at least some types of commands to the wire-transfer application. For instance, a user may manually and individually establish a connection over a network to the wire-transfer application. The user may then manually enter a command into the wire-transfer application. But, the command may be rejected if the user does not have the appropriate authorization credentials. In other cases, the user may not even be allowed to establish a connection to the wire-transfer application to begin with (e.g., due to a security restriction or a configuration setting).

DETAILED DESCRIPTION

Figure 1:
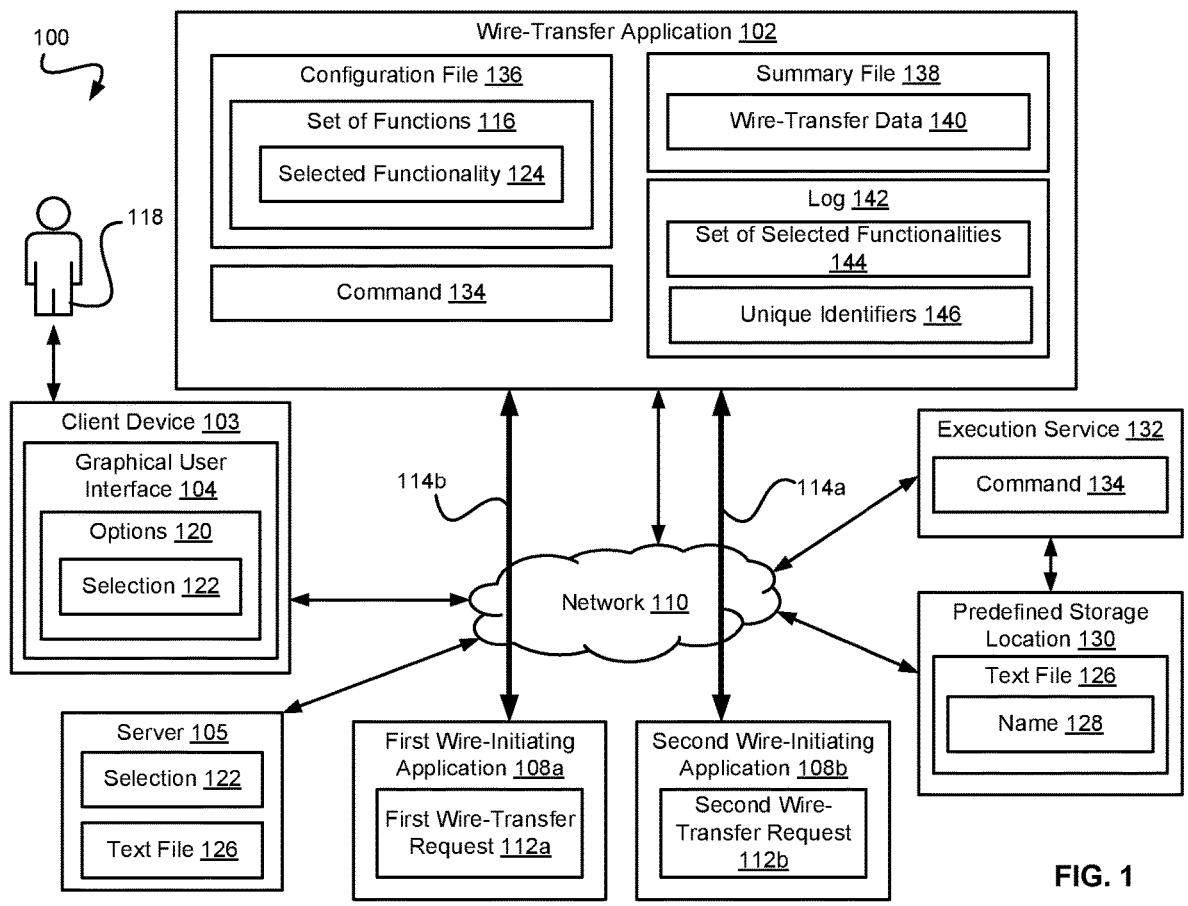
FIG. 1 is a block diagram of an example of a computing environment for enabling user initiation of functionalities for a wire-transfer application according to some aspects of the present disclosure.

Wire-transfer applications that process wire transfer requests may be large, complex applications that may require authorization credentials to perform certain operations. One example of such an application is the Money Transfer System (MTS) application. Issues may arise as wire-transfer requests are received by, processed, or transmitted from a wire-transfer application. Many users of the MTS application may not have the authorization credentials required to interact with the wire-transfer application and resolve such issues. For example, an error may arise in an authentication process for a wire-transfer request. The authentication process may fail, and the wire-transfer request may be "trapped" (e.g., remain pending) rather than becoming approved or denied. A user may identify that the wire-transfer request is trapped, but may not have the authorization credentials needed to cancel the wire-transfer request or restart the authentication process. As a result, the trapped request may remain pending indefinitely, consuming valuable computing resources. Errors, trapped requests, application failures, and other problems associated with the wire-transfer application can waste significant computing resources (e.g., memory usage and processing power), especially when they remain unresolved for long periods of time. These problems can also cascade, causing downstream operations of the wire-transfer application to also experience issues. For example, the wire-transfer application may not process subsequent wire-transfer requests as efficiently or may fail altogether.

In addition to the above problems, in some cases, wire-transfer requests may be transmitted to the wire-transfer application at certain times of day via communication channels. Each communication channel can connect a service, such as a wire-initiating application, to the wire-transfer application. A user of a wire-initiating application can start up a communication channel between the wire-initiating application and the wire-transfer application. Wire-transfer requests can then be transmitted between the wire-initiating application and the wire-transfer application. But, the user may not have the authorization credentials required to start up all communication channels for all services at the same time (e.g., substantially contemporaneously). Instead, the user may have to individually log into each service and establish the communication channel. As there can be many (e.g., dozens) of communication channels, starting up each communication channel individually every day may be time-consuming and may consume unnecessary computing resources. Similarly, the user may shut down each communication channel individually at the end of the day. Functions required for end-of-day processing may also be initiated individually.

Some examples of the present disclosure overcome one or more of the abovementioned problems by allowing a user to initiate wire-transfer application functionalities by providing the user with a graphical user interface that is supported by a corresponding execution service with elevated privileges in the computing environment. For example, the graphical user interface can be customized to display functions for the wire-transfer applications to the user. Functions that should not be initiated by the user, even via the graphical user interface, are not displayed in the graphical user interface. The user may not be authorized to interact with the wire-transfer application outside of the graphical user interface. Examples of functions that can be initiated via the graphical user interface can include recycling trapped wire-transfer requests, canceling wire-transfer requests, or simultaneous start-up or shut-down of communication channels for the wire-transfer application. Selecting a function via the graphical user interface can cause the execution service, which has elevated privileges or the authorization credentials required to perform the displayed functions, to interact with the wire-transfer application to initiate the function. In this way, issues relating to processing wire-transfer requests can be mitigated or avoided in the wire-transfer application without giving unauthorized users unnecessary privileges. This can result in improved performance of the wire-transfer application and reduction of wasteful consumption of bandwidth and computing resources, while also maintaining the security integrity of the computer system. Further, operations that would otherwise involve multiple, repeated initiations by the user (e.g., shutting down or starting up the communication channels) can be initiated with a single selection via the graphical user interface.

In one particular example, a user may interact with a graphical user interface on a client device. The graphical user interface can display options of functions that can be performed by the wire-transfer application in a secure computing environment. The displayed options can represent functions that the user may initiate without having the authorization credentials to do so in the secure computing environment. For example, the displayed options may only be performed using an administrative ID, which the user may not have for security reasons. The administrative ID can have authorization credentials for many or all functions of the wire-transfer application, including the functions displayed as options on the graphical user interface. The displayed options may be functions that can be performed to improve the functioning of the wire-transfer application. But, because the user does not have the administrative ID, the user would normally be unable to initiate the functions. And, allowing all users of the wire-transfer application to use the administrative ID, which can also provide access to more valuable functions in the wire-transfer application, may introduce security risks. The graphical user interface can therefore be used to allow a user without the administrative ID (e.g., a limited-privilege user) to initiate certain functions for the wire-transfer application.

The user can select an option on the graphical user interface for a particular function. For example, the user can select an option corresponding to canceling a group of wire-transfer requests. Because the user does not itself have the authorization credentials or privileges (such as the administrative ID) needed to initiate the functions, the client device cannot directly send a command directing the wire-transfer application to perform the function. Instead, selecting the option can cause a separate execution service, which is authorized to perform the function, to send the command on behalf of the user. For example, the execution service may access the wire-transfer application using the administrative ID. When the client device transmits the selected option, a server in the secure computing environment can generate a text file indicating the selected function. The text file may specify the group of wire-transfer requests along with instructions for cancelling the group of wire-transfer requests by the wire-transfer application. The text file can be saved into a folder that is monitored by the execution service. The execution service may have the authorization credentials required to cause the wire-transfer application to perform the functions displayed in the graphical user interface. When the execution service detects the text file in the folder, the execution service can generate and issue a command to the wire-transfer application to cause the wire-transfer application to cancel the group of wire-transfer requests. A unique identifier for the user can then be logged in association with the function to create an audit trail. Thus, security of the wire-transfer application can be maintained while allowing users to initiate certain functions to prevent or mitigate issues in the wire-transfer application.

These illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for enabling user initiation of functionalities for a wire-transfer application 102 according to some aspects of the present disclosure. The computing environment 100 can include the wire-transfer application 102, a client device 103, a server 105, an execution service 132, and one or more wire-initiating applications 108a-b that can communicate via a network 110. The network 110 can be a public data network, a private data network, or some combination thereof. A data network may include one or more of a variety of different types of networks, including a wireless network, a wired network, or a combination of a wired and a wireless network. Examples of suitable networks include the Internet, a personal area network, a local area network (LAN), a wide area network (WAN), or a wireless local area network (WLAN). Examples of the client device 103 can include desktop computers, servers, mobile phones (e.g., cellular phones, PDAs, tablet computers, net books, laptop computers, hand-held specialized readers, and wearing devices such as smart watches.

The wire-transfer application 102 can process and perform wire-transfers between computing systems (e.g., transfers of money between one or more entity's accounts hosted on the computer systems). For example, the wire-transfer application 102 can transmit or receive wire-transfer requests 112a-b from one or more wire-initiating applications 108a-b. The wire-transfer requests 112a-b can be transmitted to or received from the wire-transfer application 102 via communication channels 114a-b, also referred to as "lines." The communication channels 114a-b can be socket connections or message queue (MQ) connections between the wire-transfer application 102 and the wire-initiating applications 108a-b. The wire-transfer application 102 may process wire-transfer requests 112a-b to perform wire transfers between computing devices. Some operations performed by the wire-transfer application 102, such as a set of functions 116, may require selective authorization to perform. That is, a user 118 may not have authorization to initiate the set of functions 102 or to interact with the wire-transfer application 102 at all.

For example, the user 118 may not have permissions in the computing environment 100 to startup or shutdown multiple communication channels 114a-b concurrently. More specifically, the communication channels 114a-b may only be active at certain times of day. For example, communication channels 114a-b may be started up at the beginning of the day and shut down at the end of the day to prevent wire-transfer requests 112a-b from being processed overnight. Typically, each communication channel 114 may be individually started up or shut down manually by the user 118. But, individually starting up or shutting down dozens of communication channels 114a-b may be time-consuming and, because of overlapping data (e.g., headers) in the requests, may waste bandwidth and computing resources in repeatedly transmitting and processing the same or similar data. So, it may be desirable for the user 118 to be able to startup or shutdown some or all communication channels 114a-b at the same time (e.g., substantially contemporaneously). Normally, though, the user 118 may not have the authorization credentials required to start up or shut down all communication channels 114a-b at the same time for the wire-transfer application 102.

As another example, a first wire-transfer request 112a transferred to the wire-transfer application 102 may become "trapped" (e.g., experience errors that prevent the wire-transfer request 112 from being processed by the wire-transfer application 102). The user 118 may determine that the first wire-transfer request 112a is trapped, but may not have the authorization credentials required to cause the wire-transfer application 102 to address the issue. A trapped wire-transfer request 112 that remains unaddressed may indicate a larger issue, or may cause additional issues in the computing environment 100. Similarly, the user 118 may wish to cancel a second wire-transfer request 112b after initiation by the second wire-initiating application 108b. But, the user may not have the authorization credentials required to cancel the second wire-transfer request 112b.

In order to enable user initiation of the set of functions 116 for the wire-transfer application 102, a graphical user interface 104 can be presented to the user 118 on the client device 103. The graphical user interface 104 can display the set of functions 116 as options 120 (e.g., menu items, buttons, check boxes, etc.). The functions 116 may include functions that the user 118 would be otherwise unauthorized to initiate in the computing environment 100. The user 118 may be authorized by an entity, such as a business, that manages the computing environment 100 to interact with the graphical user interface 104 to initiate the set of functions 116. But, the wire-transfer application 102 may be configured to prevent most users from directly initiating the set of functions 116 to maintain security for the computing environment 100. Thus, the graphical user interface 104 can allow the user 118 to indirectly initiate the set of functions 116 without jeopardizing the security of the computing environment 100.

The user 118 may interact with the graphical user interface 104 to make a selection 122 for a selected functionality 124, such as to start up the communication channels 114a-b. When the user 118 makes the selection 122, the client device 103 can transmit the selection 122 to a server 105 in the computing environment 100. The server 105 may not have authorization in the computing environment 100 to transmit the appropriate commands to the wire-transfer application 102 (e.g., for security reasons the server 105 may also be a limited-privilege user in the computing environment 100). So, when the server 105 receives the selection 122 from the client device 103, the server 105 can interact with the an execution service 132 that can initiate the selected functionality 124. The server 105 may interact with the execution service 132 via a file, messaging, or a data structure stored in memory, or any other suitable means.

For example, the server 105 can generate a text file 126. The text file 126 can include data identifying the selected functionality 124, such as a name 128 of the selected functionality 124. For example, the text file 126 may be named "Start of Day Processing." The server 105 can then store the text file 126 in a predefined storage location 130 that can be monitored by the execution service 132. The execution service 132 can automatically detect the presence of the text file 126. In some examples, the execution service 132 may detect the text file 126 based on the name 128. Alternatively, rather than a text file 126 stored in a folder or a database, the server 105 can generate a data structure stored in RAM that is accessible to the execution service 132. The data structure can include the data identifying the selected functionality 124.

The execution service 132 can automatically issue a command 134 to the wire-transfer application 102 based on the selected functionality 124. For example, the execution service 132 can issue the command 134 based on the presence or content of the text file 126, to cause the wire-transfer application 102 to execute the selected functionality 124. In some such examples, the execution service 132 can extract the content from the text file 126, analyze the content, and based on the content, generate and transmit the command 134. Different content may be mapped to different commands using a predefined lookup table or other techniques, or the content of the text file 126 may itself be at least part of the command 134.

The execution service 132 can have the required authorization to cause the wire-transfer application 102 to execute the selected functionality 124. For example, the execution service 132 may have elevated privileges (e.g., administrative privileges) in the computing environment 100 that allow the execution service 132 to issue commands 134 to the wire-transfer application 102 and thereby initiate the selected functionality 124. Additionally or alternatively, the execution service 132 may have authentication information (e.g., a username and password) that confers the requisite permissions on the execution service 132. The wire-transfer application 102 may receive the command 134 and execute the corresponding functionality. For instance, the wire-transfer application 102 may establish connections with the wire-initiating applications 108a-b via the communication channels 114a-b. This can allow wire-transfer requests 112a-b to be transferred between the wire-initiating applications 108a-b and the wire-transfer application 102.

In some examples, the user 118 may determine that the first wire-transfer request 112a has been trapped in a particular function executed by the wire-transfer application 102. For example, the first wire-transfer request 112a may be trapped in a function that identifies a recipient of the wire transfer. The function may be malfunctioning and may be unable to identify the recipient, which can prevent the requested wire transfer from being performed. To address the issue, the user 118 can interact with the graphical user interface 104 to view functions that can be recycled (e.g., restarted). For example, data can be extracted from a configuration file 136 for the wire-transfer application 102. The data can indicate which functions (e.g., the set of functions 116) can be restarted by the wire-transfer application 102 in response to commands sent by the execution service 132. The graphical user interface 104 can be customized to include options 120 that correspond to the set of functions 116 via the configuration file 136.

The user 118 may select the option 120 that corresponds to the selected functionality 124 in which the first wire-transfer request 112a is trapped. The resulting text file 126 stored in the predefined storage location 130 may indicate the selected functionality 124, and that the first wire-transfer request 112a should be recycled. The command 134 transmitted by the execution service 132 can cause the wire-transfer application 102 to stop the selected functionality 124 and then to restart the selected functionality 124. Alternatively, the command 134 can cause the wire-transfer application 102 to stop the first wire-transfer request 112a from being processed by the selected functionality 124 and then to restart the first wire-transfer request 112a in the selected functionality 124. Recycling the selected functionality 124 or the first wire-transfer request 112a may allow the first wire-transfer request 112a to be properly processed by the wire-transfer application 102.

Similarly, the user 118 may decide to cancel the second wire-transfer request 112b initiated by the second wire-initiating application 108b. The user 118 can interact with the graphical user interface 104 to select the option 120 that corresponds to the selected functionality 124 for the second wire-transfer request 112b. The resulting text file 126 detected by the execution service 132 can indicate the selected functionality 124 to cancel the second wire-transfer request 112b. Then, the execution service 132 can transmit the command 134 to the wire-transfer application 102. In response, the wire-transfer application 102 can stop the second wire-transfer request 112b from being processed.

In yet another example, the selected functionality 124 may involve shutting down each of the communication channels 114a-b at the same time. For example, the text file 126 may include a bulk entry specifying each communication channel 114 to shut down. The communication channels 114a-b may be shut down to perform end-of-day processing of wire-transfer requests 112a-b. Such end-of-day processing may also be included in the selected functionality 124. For example, after the wire-transfer application 102 shuts down the communication channels 114a-b, the wire-transfer application 102 can generate a summary file 138. The summary file 138 can include wire-transfer data 140 for all wire-transfer requests 112a-b transmitted via the communication channels 114a-b since the communication channels 114a-b were started up. Typically, the user 118 may not have the required authorization to generate the summary file 138 for all wire-transfer requests 112a-b at the same time. But, the graphical user interface 104 can enable user initiation of this selected functionality 124. The summary file 138 generated for all wire-transfer requests 112a-b simultaneously can be submitted to the wire-transfer application 102 for further processing of the wire-transfer requests 112a-b.

Additionally, all functions initiated by the user 118 via the graphical user interface 104 may be recorded. For example, each time the command 134 is issued by the execution service 132, a log 142 can be generated. The log 142 can indicate the set of selected functionalities 144 that have been selected by the user 118 via the graphical user interface 104. The log 142 can also include a unique identifier 146 indicating the user 118 that selected each functionality. In this way, certain users 118 without authorization credentials can be allowed to initiate certain functions for the wire-transfer application 102 with an audit trail.

Although FIG. 1 depicts a certain number and arrangement of components, this is for illustrative purposes and intended to be non-limiting. Other examples may include more components, fewer components, different components, or a different arrangement of the components shown in FIG. 1. And, although the examples described herein involve a wire-transfer application, similar techniques can be applied to other types of applications.

Figure 2:
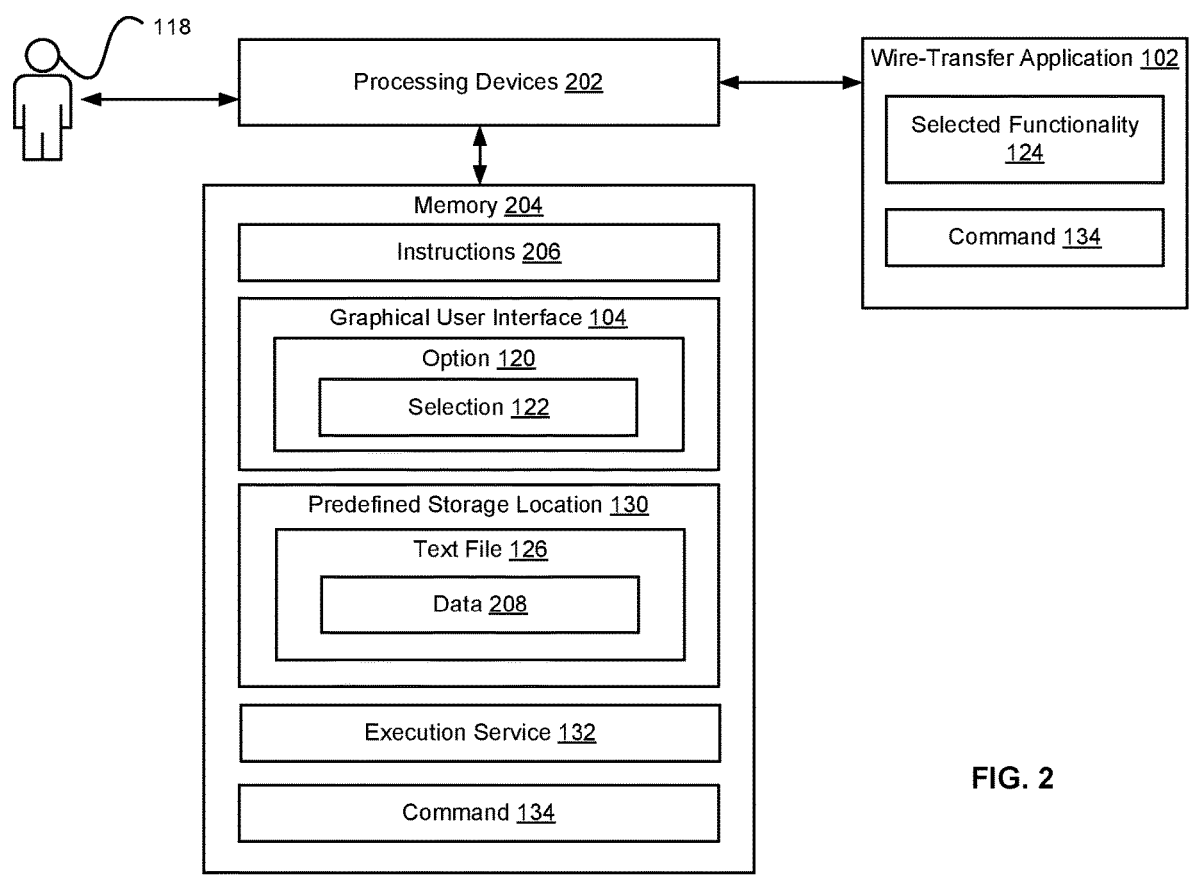
FIG. 2 is a block diagram of another example of a computing environment for enabling user initiation of functionalities for a wire-transfer application according to some aspects of the present disclosure.

FIG. 2 is a block diagram of an example of a computing environment 200 for enabling user initiation of functionalities for a wire-transfer application according to some aspects of the present disclosure. The computing environment 200 depicted in FIG. 2 includes one or more processing devices 202 communicatively coupled to a memory 204.

The processing devices 202 can include one processor or multiple processors. Non-limiting examples of the processing device 202 include a Field-Programmable Gate Array (FPGA), an application-specific integrated circuit (ASIC), a microprocessor, etc. The processing devices 202 can execute instructions 206 stored in the memory 204 to perform operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory can include a non-transitory computer-readable medium from which the processing devices 202 can read instructions 206. A computer-readable medium can include electronic, optical, magnetic, or other storage devices capable of providing the processing device with computer-readable instructions or other program code. Examples of a computer-readable medium include magnetic disk(s), memory chip(s), ROM, RAM, an ASIC, a configured processor, optical storage, or any other non-transitory medium from which a computer processor can read the instructions 206.

In some examples, the processing devices 202 can detect a selection 122 by a user 118 of an option 120 in a graphical user interface 104. The option 120 can be to initiate a selected functionality 124 of a wire-transfer application 102 in a computing environment 100. The user 118 may not be authorized in the computing environment 100 to interact with the wire-transfer application 102 outside of the graphical user interface 104. In response to detecting the selection 122, the processing devices 202 can generate a text file 126 that includes data 208 identifying the selected functionality 124 to be executed by the wire-transfer application 102. The processing devices 202 can store the text file 126 in a predefined storage location 130 that is monitored by an execution service 132. The execution service 132 can be executed by the processing devices 202 to automatically detect a presence of the text file 126 in the predefined storage location 130. In response to detecting the text file 126, the execution service 132 can automatically issue a command 134 to the wire-transfer application 102 for causing the wire-transfer application 102 to execute the selected functionality 124.

Figure 3:
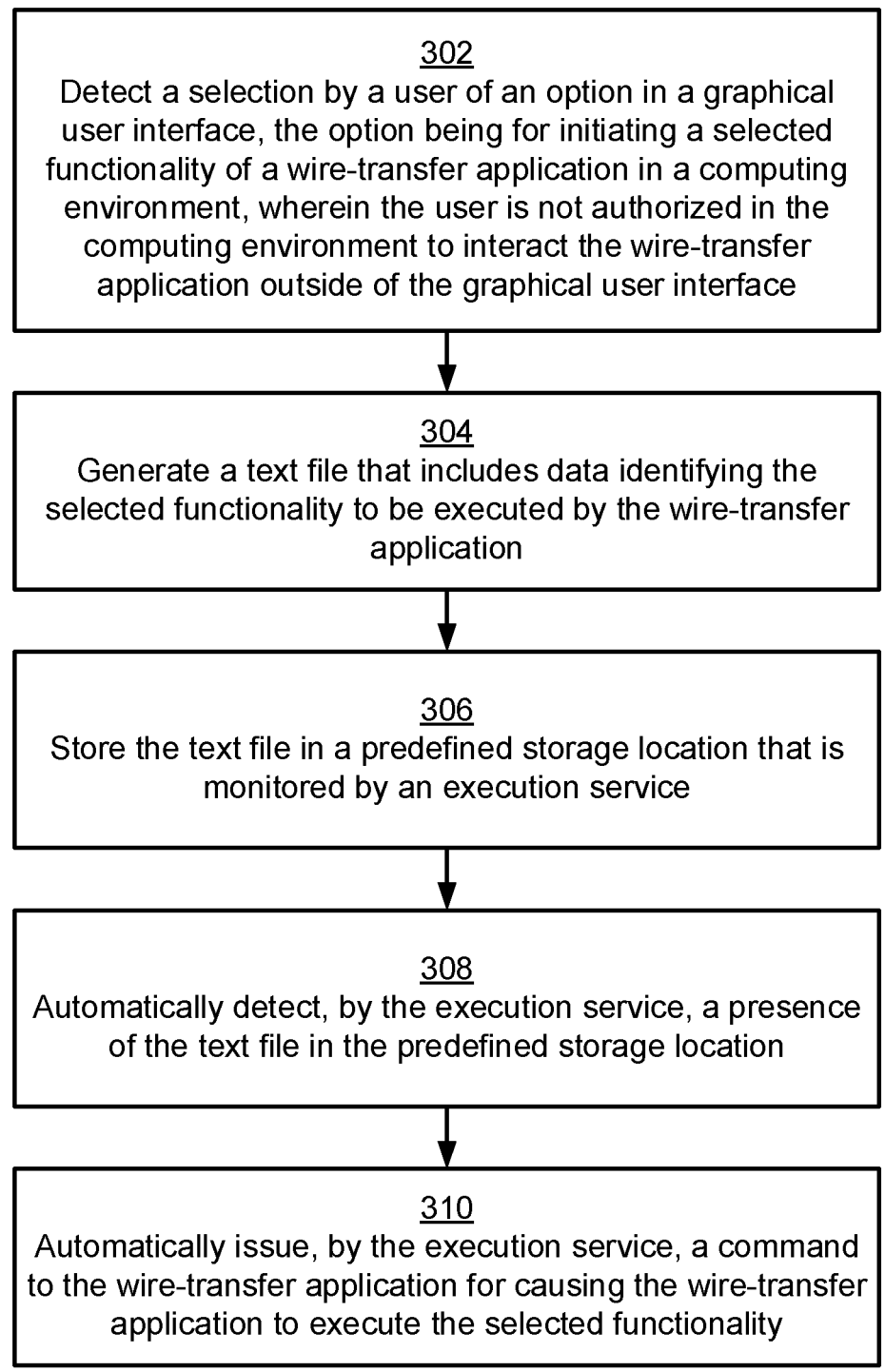
FIG. 3 is a flowchart of a process for enabling user initiation of functionalities for a wire-transfer application according to some aspects of the present disclosure.

FIG. 3 is a flowchart of a process for enabling user initiation of functionalities for a wire-transfer application according to some aspects of the present disclosure. FIG. 3 is described with references to components in FIGS. 1-2. Other examples can include more steps, fewer steps, different steps, or a different order of the steps than is depicted in FIG. 3.

At block 302, the processing devices 202 can detect a selection 122 by a user 118 of an option 120 in a graphical user interface 104. The option 120 can be to initiate a selected functionality 124 of a wire-transfer application 102 in a computing environment 100. The user 118 may not be authorized in the computing environment 100 to interact with the wire-transfer application 102 outside of the graphical user interface 104. The graphical user interface 104 can be customized to include options 120 that correspond to functions that can be initiated for the wire-transfer application 102. For example, the user 118 may interact with the graphical user interface 104 to select wire-transfer requests 112a-b that can be canceled or recycled. The processing devices 202 can access a configuration file 136 to identify a set of functions 116 that can be executed to recycle or cancel wire-transfer requests 112a-b. The user 118 can then select an option 120 that corresponds to a selected functionality 124 that can recycle the first wire-transfer request 112a.

At block 304, in response to detecting the selection 122, the processing devices 202 can generate a text file 126 that includes data 208 identifying the selected functionality 124 to be executed by the wire-transfer application 102. The text file 126 can include instructions for recycling the first wire-transfer request.

At block 306, the processing devices 202 can store the text file 126 in a predefined storage location 130 that is monitored by an execution service 132. For example, the predefined storage location 130 may be a database or a folder into which the text file can be stored.

At block 308, the processing devices 202 can execute the execution service 132 to automatically detect a presence of the text file 126 in the predefined storage location 130. In some examples, the execution service 132 may detect and automatically process any new text file 126 in the predefined storage location 130. In other examples, the execution service 132 may monitor the predefined storage location 130 for particular types of text files. For example, the execution service 132 may detect and process a text file 126 that has a name 128 that corresponds to a function from the set of functions 116, such as "recycling". After detection, the execution service 132 can identify the selected functionality 124 based on the data 208 in the text file 126. The execution service 132 may determine that the text file 126 initiating a recycling process for the first wire-transfer request 112a.

At block 310, in response to detecting the text file 126, the processing devices 202 can execute the execution service 132 to automatically issue a command 134 to the wire-transfer application 102 for causing the wire-transfer application 102 to execute the selected functionality 124. For example, the command 134 can cause the wire-transfer application 102 to execute the selected functionality 124 by stopping the first wire-transfer request 112a and then restarting the first wire-transfer request 112a. In some examples, the selected functionality 124 can involve stopping and restarting a thread or program that is processing the first wire-transfer request 112a. Recycling the first wire-transfer request 112a may enable the first wire-transfer request 112a to be successfully processed by the wire-transfer application 102. In some examples, the selected functionality 124 may be recorded in a log 142 in association with a unique identifier 146 for the user 118.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   one or more processing devices; and
   a non-transitory computer-readable memory comprising instructions that are executable by the one or more processing devices for causing the one or more processing devices to:
      detect a selection by a user of an option in a graphical user interface, the option being for initiating a selected functionality of a wire-transfer application in a computing environment, wherein the user is not authorized in the computing environment to interact with the wire-transfer application outside of the graphical user interface;
      in response to detecting the selection, generate a text file that includes data identifying the selected functionality to be executed by the wire-transfer application;
      store the text file in a predefined storage location that is monitored by an execution service;
      automatically detect, by the execution service, a presence of the text file in the predefined storage location; and
      in response to detecting the text file, automatically issue, by the execution service, a command to the wire-transfer application for causing the wire-transfer application to execute the selected functionality.

2. The system of claim 1, wherein the instructions are further executable by the one or more processing devices for causing the one or more processing devices to:
   extract data, from a configuration file, indicating a set of functions that are executable by the wire-transfer application; and
   based on the data, customize the graphical user interface to include options corresponding to the set of functions, each of the options being selectable by the user to initiate a corresponding function from among the set of functions.

3. The system of claim 1, wherein the instructions are further executable by the one or more processing devices for causing the one or more processing devices to automatically detect the presence of the text file based on a name of the text file.

4. The system of claim 1, wherein the instructions are further executable by the one or more processing devices for causing the one or more processing devices to execute the selected functionality by authorizing the wire-transfer application to perform the selected functionality.

5. The system of claim 1, wherein the selected functionality involves recycling a wire-transfer request transmitted to the wire-transfer application, and wherein the command includes a plurality of commands configured for:
   stopping the wire-transfer request; and
   subsequent to stopping the wire-transfer request, restarting the wire-transfer request for the wire-transfer application.

6. The system of claim 1, wherein the selected functionality involves canceling a wire-transfer request transferred to the wire-transfer application, and wherein the command is configured for stopping the wire-transfer request from being processed by the wire-transfer application.

7. The system of claim 1, wherein the selected functionality involves enabling transmission of a plurality of wire-transfer requests between one or more wire-initiating applications and the wire-transfer application via a plurality of communication channels substantially contemporaneously, and wherein the command is configured for starting up each of the plurality of communication channels substantially contemporaneously.

8. The system of claim 7, wherein the selected functionality involves disabling transmission of the plurality of wire-transfer requests substantially contemporaneously, and wherein the command is configured for shutting down each of the plurality of communication channels substantially contemporaneously.

9. The system of claim 1, wherein the instructions are further executable by the one or more processing devices for causing the one or more processing devices to:
   in response to automatically issuing the command, generate a log indicating (i) a set of selected functionalities initiated by users through the graphical user interface and (ii) unique identifiers of the users.

10. A method comprising:
    detecting, by one or more processing devices, a selection by a user of an option in a graphical user interface, the option being for initiating a selected functionality of a wire-transfer application in a computing environment, wherein the user is not authorized in the computing environment to interact with the wire-transfer application outside of the graphical user interface;
    in response to detecting the selection, generating, by the one or more processing devices, a text file that includes data identifying the selected functionality to be executed by the wire-transfer application;

storing, by the one or more processing devices, the text file in a predefined storage location that is monitored by an execution service;

automatically detecting, by the execution service, a presence of the text file in the predefined storage location; and in response to detecting the text file, automatically issuing, by the execution service, a command to the wire-transfer application for causing the wire-transfer application to execute the selected functionality.

11. The method of claim 10, further comprising:

extracting data, from a configuration file, indicating a set of functions that are executable by the wire-transfer application; and based on the data, customizing the graphical user interface to include options corresponding to the set of functions, each of the options being selectable by the user to initiate a corresponding function from among the set of functions.

12. The method of claim 10, wherein the presence of the text file is automatically detected based on a name of the text file.

13. The method of claim 10, wherein executing the selected functionality further comprises authorizing the wire-transfer application to perform the selected functionality.

14. The method of claim 10, wherein the selected functionality involves recycling a wire-transfer request transmitted to the wire-transfer application, and wherein the command includes a plurality of commands configured for:

stopping the wire-transfer request; and subsequent to stopping the wire-transfer request, restarting the wire-transfer request for the wire-transfer application.

15. The method of claim 10, wherein the selected functionality involves canceling a wire-transfer request transferred to the wire-transfer application, and wherein the command is configured for stopping the wire-transfer request from being processed by the wire-transfer application.

16. The method of claim 10, wherein the selected functionality involves enabling transmission of a plurality of wire-transfer requests between one or more wire-initiating applications and the wire-transfer application via a plurality of communication channels substantially contemporaneously, and wherein the command is configured for starting up each of the plurality of communication channels substantially contemporaneously.

17. The method of claim 16, wherein the selected functionality involves disabling transmission of the plurality of wire-transfer requests substantially contemporaneously, and wherein the command is configured for shutting down each of the plurality of communication channels substantially contemporaneously.

18. A non-transitory computer-readable medium comprising program code executable by one or more processing devices for causing the one or more processing devices to:

detect a selection by a user of an option in a graphical user interface, the option being for initiating a selected functionality of a wire-transfer application in a computing environment, wherein the user is not authorized in the computing environment to interact the wire-transfer application outside of the graphical user interface;

in response to detecting the selection, generate a text file that includes data identifying the selected functionality to be executed by the wire-transfer application;

store the text file in a predefined storage location that is monitored by an execution service;

automatically detect, by the execution service, a presence of the text file in the predefined storage location; and in response to detecting the text file, automatically issue, by the execution service, a command to the wire-transfer application for causing the wire-transfer application to execute the selected functionality.

19. The non-transitory computer-readable medium of claim 18, wherein the program code is further executable by the one or more processing devices for causing the one or more processing devices to:

extract data, from a configuration file, indicating a set of functions that are executable by the wire-transfer application; and based on the data, customize the graphical user interface to include options corresponding to the set of functions, each of the options being selectable by the user to initiate a corresponding function from among the set of functions.

20. The non-transitory computer-readable medium of claim 18, wherein the program code is further executable by the one or more processing devices for causing the one or more processing devices to automatically detect the presence of the text file based on a name of the text file.

* * * * *